(12) United States Patent
Kang et al.

(10) Patent No.: US 9,652,043 B2
(45) Date of Patent: May 16, 2017

(54) RECOGNIZING COMMANDS WITH A DEPTH SENSOR

(75) Inventors: Jinman Kang, San Diego, CA (US); Charles Jia, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 13/470,885

(22) Filed: May 14, 2012

(65) Prior Publication Data

US 2013/0300659 A1 Nov. 14, 2013

(51) Int. Cl.
*G06F 3/033* (2013.01)
*G06F 3/01* (2006.01)

(52) U.S. Cl.
CPC .................. *G06F 3/017* (2013.01)

(58) Field of Classification Search
CPC ....................................... G06F 3/017
USPC ........................... 345/697, 170–175
See application file for complete search history.

(56) References Cited

U.S. PATENT DOCUMENTS

| | | | |
|---|---|---|---|
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,474,809 B2 | 1/2009 | Carl et al. | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 2003/0156756 A1* | 8/2003 | Gokturk et al. | 382/190 |
| 2005/0041216 A1* | 2/2005 | Kobayashi | 353/69 |
| 2005/0168437 A1 | 8/2005 | Carl et al. | |
| 2011/0096036 A1 | 4/2011 | McIntosh et al. | |
| 2011/0175829 A1* | 7/2011 | Miyazawa et al. | 345/173 |
| 2011/0205186 A1* | 8/2011 | Newton et al. | 345/175 |
| 2011/0227915 A1 | 9/2011 | Mandella et al. | |
| 2012/0038549 A1 | 2/2012 | Mandella et al. | |
| 2012/0051605 A1 | 3/2012 | Nagar et al. | |
| 2013/0194418 A1 | 8/2013 | Gonzalez-Banos et al. | |

OTHER PUBLICATIONS

"3D Tracking and Control Interface, 3D Depth Sensing for Hand and Body Gesture Control"; Jan. 23, 2009; http://www.youtube.com/watch?v=cymAuLdP47Q.

"A Hand Gesture Recognition System for Replacing a Mouse"; Dec. 3, 2006; http://www.youtube.com/watch?v=J_dLfvh3zs4.

"Real-time Hand Motion/gesture Detection for HCI—Demo 1"; Dec. 17, 2008; http://www.youtube.com/watch?v=sEGY6MyPqsY& feature=related.

(Continued)

*Primary Examiner* — Tony Davis
(74) *Attorney, Agent, or Firm* — Fabian VanCott

(57) ABSTRACT

Recognizing a command may include monitoring a tangible reference with a depth sensor, maintaining a virtual reference approximately on calibrated three dimensional coordinates of the tangible reference, maintaining a touch space adjacent the virtual reference, and recognizing a command when a predetermined object enters the touch space.

20 Claims, 8 Drawing Sheets

(56) References Cited

OTHER PUBLICATIONS

Verdie, Y.; "Evolution of Hand Tracking Algorithms to Mirrortrack"; Nov. 11, 2008; http://vislab.cs.vt.edu~vislab/wiki/images/2/26/ReviewMirrorTrack.pdf.

Gao, Rui et al; Microsoft Research-Mobile Surface; Microsoft Research 2010; http://research.microsoft.com/en-us/projects/mobilesurface/.

Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.

Harrison, Beverly & Ziola, Ryder; Bringing Toys to Life: Intel Labs OASIS Project: Augmented Engineering; Jan. 26, 2011; http://augmentedengineering.wordpress.com/2011/01/26/bringing-toys-to-life-intel-labs-oasis-project/.

Harrison, Chris et al; OmniTouch: Wearable Multitouch Interaction Everywhere; UIST'11; Oct. 16, 2011; Santa Barbara, California; http://research.microsoft.com/en-us/um/people/awilson/publications/HarrisonUIST2011/HarrisonUIST2011.html.

Hartmann, Bjorn et al; Pictionaire: Supporting Collaborative Design Work by Integrating Physical and Digital Artifacts: CSCW 2010; Feb. 6, 2010; Savannah, Georgia; http://research.microsoft.com/en-us/um/people/awilson/publications/HartmannCSCW2010/HartmannCSCW2010.html.

Hinckley; Ken et al; Pen + Touch = New Tools; UIST'10; Oct. 3, 2010; New York, New York; http://research.microsoft.com/en-us/um/people/awilson/publications/HinckleyUIST2010/HinckleyUIST2010.html.

Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.

Junuzovic, Sasa et al; Microsoft Research-IllumiShare; Microsoft Research; 2012; http://delivery.acm.org/10.1145/2210000/2208333/p1919-junuzovic.pdf?ip=15.219.153.76&id=2208333&acc=ACTIVE%20SERVICE&key=C2716FEBFA981EF153FE223D54A46A411F9E1F05F1DA6F38&CFID=271558808;CFTOKEN=96334302&_acm_=1387226323_00af7aa5e159c7c67d724c49ef01bacf.

Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.

Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist10_demo.pdf.

Melanson, Donald; Microsoft Research Working on Portable Surface; Mar. 2, 2010; http://www.engadget.com/2010/03/02/microsoft-research-working-on-portable-surface/.

Melanson, Donald; Wiimote Repurposed for Multi-Point interactive Whiteboard; Dec. 10, 2007; http://www.engadget.com/2007/12/10/wiimote-repurposed-for-multi-point-interactive-whiteboard/.

Simonite, Tom; A Kitchen Countertop With a Brain; MIT Technology Review; Jul. 2, 2010; http://www.Technologyreview.com/news/419839/a-kitchen-countertop-with-a-brain/.

Wilson, Andrew D. et al; Combining Multiple Depth Cameras and Projectors for Interactions on, Above, and Between Surfaces; UIST'10; Oct. 3, 2010; New York, New York; http://research.microsoft.com/en-us/um/people/awilson/publications/WilsonUIST2010/WilsonUIST2010.html.

Wilson, Andrew D.; Using a Depth Camera As a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

* cited by examiner

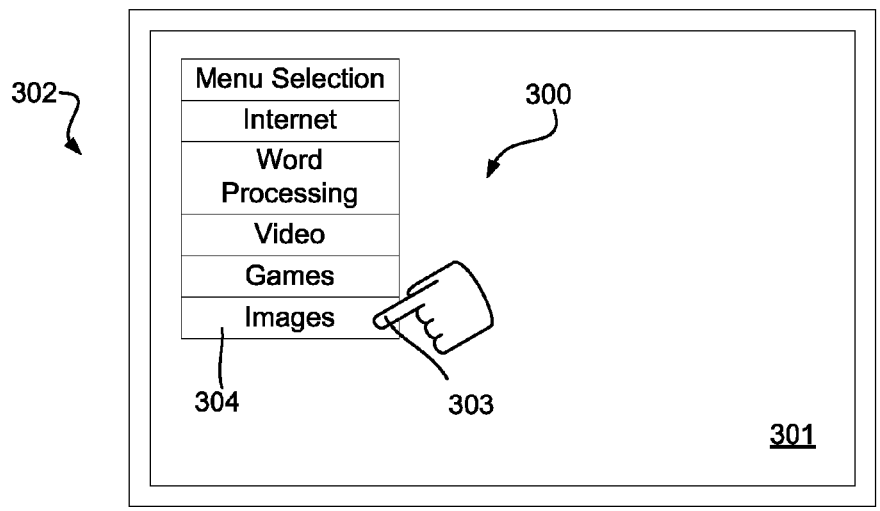
Fig. 3
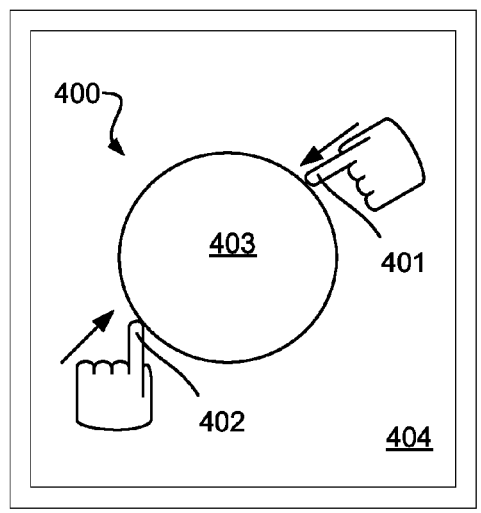 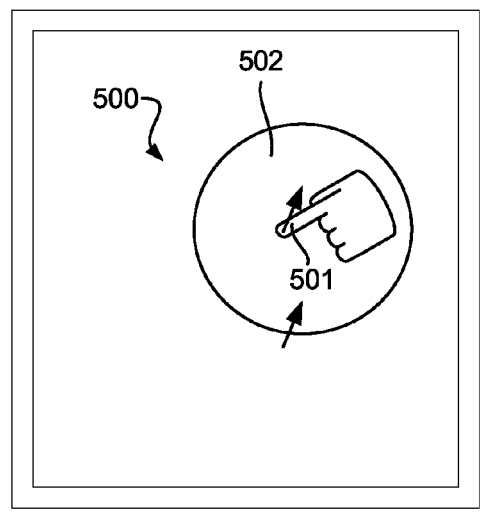
Fig. 4     Fig. 5

(12) United States Patent

RECOGNIZING COMMANDS WITH A DEPTH SENSOR

BACKGROUND

A number of mechanisms exist for communicating with computers. Some communication mechanisms include keys pad and mouse inputs. Also, touch pads and touch screens are used in laptops and mobile tablets.

Some systems track human movement for communication with computers. For example, a camera may be used to detect hand gestures made by a user. A computer may interpret these hand gestures as commands. Some systems use multiple cameras to detect the three dimensional location of the hands at the time the hand gestures are made. Inputs from each of the cameras may be integrated together for the computer to determine the hand's location.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3 is a diagram of an illustrative command, according to principles described herein.

FIG. 4 is a diagram of an illustrative command, according to principles described herein.

FIG. 5 is a diagram of an illustrative command, according to principles described herein.

DETAILED DESCRIPTION

The present specification describes subject matter including, for example, a method for recognizing a command to a system with a depth sensor. Examples of such a method include monitoring a tangible reference at a reference distance from a depth sensor, maintaining a virtual reference approximately on calibrated three dimensional coordinates of the tangible reference derived from the reference distance, maintaining a touch space between the virtual reference and a touch boundary separated from the virtual reference by a touch distance, and recognizing a command when a predetermined object enters the touch space.

An image may be displayed on the tangible reference, and the system may cause a user to feel like he is giving commands to a system as he touches the image. However, according to the principles described herein, physically touching the image does not generate a command recognized by the system. Instead, the depth sensor may track the user's hand, and data from the depth sensor may be processed to infer when the user touches the image. For instance, as the user's fingertips makes a drag, click, pinch, or other gesture within the touch space, the depth sensor, not the tangible reference, recognizes the command due to the fingertips within the touch space and responds with executing a command. The touch space may have such a shallow depth that it is likely that when a user's fingertips are within the touch space that the user's fingertips are also touching the tangible reference. In some examples, the touch space has a depth large enough so that a user does not need to touch the tangible reference to generate a command within the touch space. However, in some situations when the user's fingertips touch the tangible reference, the fingertips are already within the touch space, so the depth sensor recognizes the command as the user touches the tangible reference. Such a system gives the user a feel that he is giving the system commands based on touch, but the system is actually recognizing commands based on an inferred touch based on the three-dimensional location of the user's fingertips.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
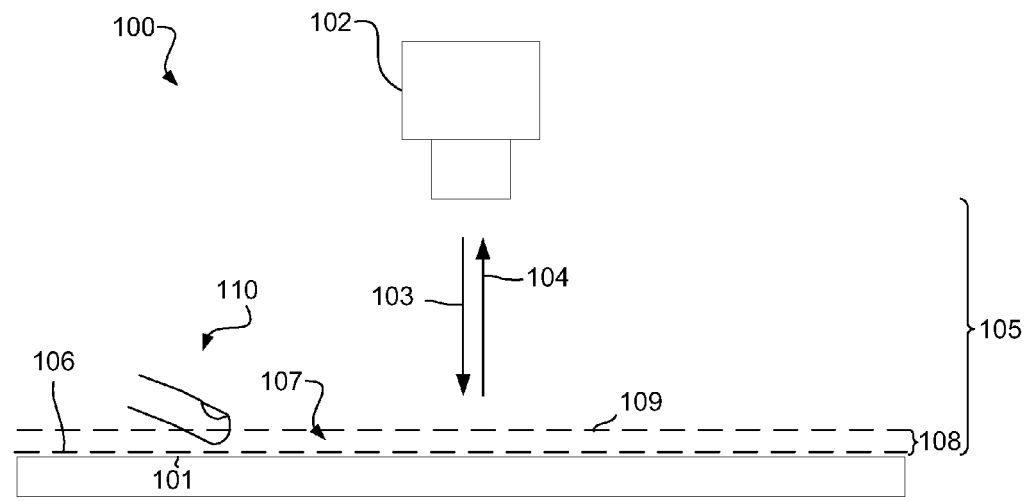
FIG. 1 is a diagram of an illustrative system for monitoring a tangible reference, according to principles described herein.

FIG. 1 is a diagram of an illustrative system (100) for monitoring a tangible reference (101), according to principles described herein. In this example, the depth sensor (102) sends a signal (103) towards the tangible reference (101). The tangible reference (101) may be a surface of a physical object, such as a screen, desk top, table top, wall, floor, spherical object, other physical object, or combinations thereof. The signal's reflection (104) may return to the depth sensor (102). Depending on the type of depth sensor used, the depth sensor (102) may detect the return time, detect changes in encoded messages on the signal (103) sent from the depth sensor, detect other conditions of the return signal, or combinations thereof. In some examples, changes in an encoded message on the reflection (103) may be processed to determine a depth map of the tangible reference (101). In other examples, the time lapse between sending the signal (103) and receiving the signal's reflection (104) may be used to determine a reference distance (105) between the depth sensor (102) and the tangible reference (101).

In some examples, the depth sensor (102) uses infrared signals to determine the reference distance (105). In such examples, the depth sensor (102) may determine the reference distance (105) regardless of the visual light present between the depth sensor (102) and the tangible reference (101). As a consequence, the depth sensor (102) may determine the reference distance (105) in daylight or in the dark.

In other examples, the depth sensor uses other types of signals, other than infrared signals, to determine the reference distance (105).

While the example of FIG. 1 depicts a measurement substantially perpendicular to the tangible reference (101), the depth sensor (102) may determine other distances between the depth sensor (102) and other locations on the tangible reference (101). By determining the reference distances between multiple locations on the tangible reference (101) and the depth sensor (102), the system (100) may determine the topography of the tangible reference (101). In the example of FIG. 1, the tangible reference's topography is substantially flat. However, in alternative examples, the topography may have a non-planar surface.

Upon receipt of the signal reflections (104), the system (100) may compile the raw data retrieved. Most, if not all, of the distance measurements between locations on the tangible reference (101) and the depth sensor (102) are unlikely to be perpendicular. In such examples, the raw data may be calibrated to reflect the actual coordinates of the tangible reference (101) in three dimensional space. The system (100) may form a virtual reference (106) approximately on the tangible reference (101) determined by the calibration of the raw data. In FIG. 1, the virtual reference (106) is depicted as being slightly offset from the tangible reference (101) for illustrative purposes. In some examples, no space exists between the virtual reference (106) and the tangible reference (101).

The virtual reference (106) may be used by the system (100) to form a touch space (107) adjacent to the tangible reference (101). The system (100) may determine a desirable touch distance (108) from the virtual reference (106) to form a touch boundary (109). The system (100) may offset the touch boundary (109) from the virtual reference (106) by the determined touch distance (108). In some examples, the touch distance (109) is five millimeters or less. In some examples, the touch distance (109) is three millimeters or less.

The system (100) may monitor the volume of the touch space (107) for predetermined objects (110) within the touch space. In the example of FIG. 1, the predetermined object is a human hand. The system (100) may recognize the predetermined object through at least one analysis approach, such as contour analysis, skeletal analysis, or combinations thereof. Further, the system (100) may also recognize the distances that the predetermined object is from the depth sensor with a time of flight approach or other distance measurement approach. For example, the data from the depth sensor may be used to construct a depth map of the hand. Based on the depth map, the system (100) may recognize the three dimensional location of the predetermined object (110) with respect to the tangible reference (101) and recognize whether the predetermined object (110) is within the touch space (107).

The mere presence of the predetermined object (110) within the touch space (107) alone may not be interpreted by the system as a command. For example, specific movements of the predetermined object (110) may be interpreted as commands when the fingertip's of the hand take place within the touch space (107). The system (100) may recognize just fingertips in the touch space and hand gestures as part of a command. As a consequence, the entrances hand part other than the finger tips, such as the palm of the hand, into the touch space may be disregarded as a command. Examples of such movements and their associated commands will be described in more detail below.

A depth sensor that may be used to determine the depth map of the tangible reference and the predetermined object may be purchased from PrimeSense, Ltd., which is headquartered in Tel Aviv, Israel. In some examples, the depth sensor may be operated following Open Natural Interaction (OpenNI) protocols, which is an open protocol compatible for obtaining raw data with the depth sensor. In other examples, other protocols for obtaining data with the depth sensor are used. Another depth sensor that may be used is PMD[vision]® CamBoard, which may be purchased from PMDTechnologies GmbH, headquartered in Siegen, Germany.

The information obtained through the depth sensor (102) may be converted into a format that is compatible with the Open Source Computer Vision Library (OpenCV), which is a library of programming functions used in the computer vision industry. Filtering protocols may be performed on the data retrieved from the depth sensor since the raw data may contain false readings and other noise, especially when the depth camera is not perfectly perpendicular to the tangible reference. Such filtering procedures may incorporate the use of Gaussian smoothing filters, median smoothing filter, other filters, or combinations thereof to reduce and/or eliminate noise.

Figure 2:
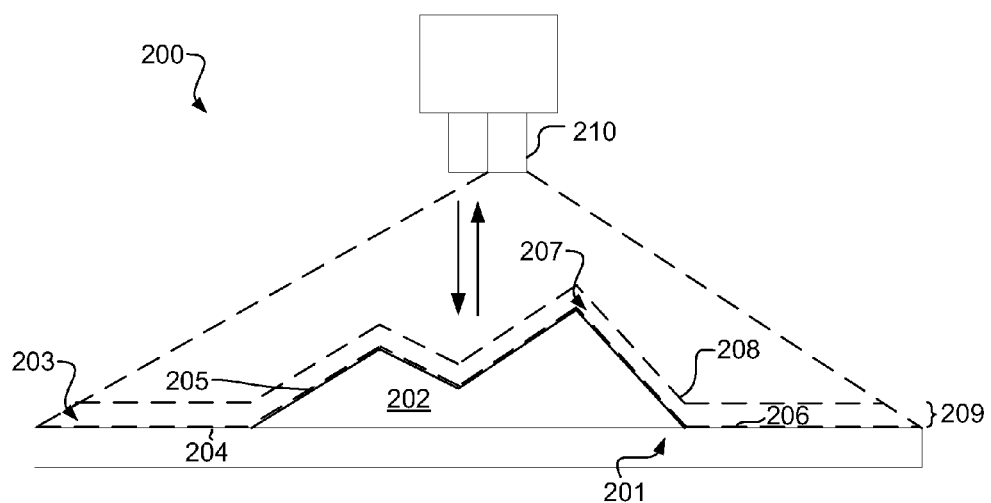
FIG. 2 is a diagram of an illustrative system for monitoring a tangible reference, according to principles described herein.

FIG. 2 is a diagram of an illustrative system (200) for monitoring a tangible reference (201), according to principles described herein. In this example, a non-planar object (202) is placed on a planar surface (203). The non-planar object (202) may be added to the planar surface (203) before or after the system (200) calibrates the measured distances of the planar surface (203). In this example, the exposed portions (204) of the planar surface (203) and the surface area (205) of the non-planar object (202) collectively form the tangible reference (201). The system (200) may periodically re-determine the reference distances to account for changes in the tangible reference (201). If changes are discovered, the system (200) may recalibrate the measurements, and reform the virtual reference (206), and reestablish the touch space (207) to reflect the changes.

In FIG. 2, the tangible reference (201) has a topography with varying elevations. As a consequence, the virtual reference (206) and the touch boundary (208) are also non-planar to conform with the non-planar topography of the tangible reference (201). The touch boundary (208) may be offset from the virtual reference by the touch distance (209) that is consistent throughout the tangible reference's entire surface area.

In FIG. 2, a projector (210) projects a visual image onto the tangible reference (201). The visual image may include buttons, drop down menus, models, pictures, videos, icons, pointers, text files, graphics, other images, or combinations thereof. In some examples, a user enters their fingertips into the touch space (207) to modify the images and/or give commands to the system (200). The visual image(s) may be depicted on the exposed planar portions (204) of the tangible reference (201) or upon the surface area (205) of the non-planar object (202). In either case, the system may recognize commands from inferred touches on the planar or non-planar portions of the tangible reference (201).

A user may feel as though the projected image changes in response to the user touching the tangible reference (201). However, the system (200) may not recognize the physical touching. Instead, the three dimensional location of the fingertips in the touch space (207) combined with a hand gesture recognized by the system (200) may be recognized as commands to modify the image. In other words, the system (200) may respond to a user's touch indirectly by inferring a touch based on the user's fingers entering into the touch space (207). In some examples, the system (200) uses an inferred touch input in combination with hand gestures to recognize commands by a user. The combination of using inferred touch and hand gestures may help to reduce and/or eliminate false readings.

For example, in a specific mode, a user may drag his finger against either the planar portions (203) or non-planar area (205) of the tangible reference (201). The system (200) may recognize this hand gesture in the touch space (207) as a command to draw a line and accordingly form a line along the path that the finger traveled. Although the user made physical contact with the surface as he dragged his finger across the tangible surface (201), the system recognizes the finger's movement within the touch space (207), and draws the line in accordance to the information tracked in the touch space (207).

In other examples, a finger may press against the tangible reference (201) over an image that symbolizes a button. Similarly, in this example, the contact with the touch space, not the actual physical contact with the tangible reference (201), is recognized as a command. The user may feel that the system responds when the user presses the visual depiction of the button. For example, the system (200) may respond by displaying a new button image that appears to be pressed down and returning to the previous button image when user moves the finger away from the button.

In some examples, an image is depicted on the tangible reference in other ways besides through a projected image. For example, the tangible reference may be a screen with pixel elements that illuminate as commanded by the system. In such an example, the user may use his fingertips to touch the illuminated images as the user desires to command the system. However, the system may respond to the tracked finger movements in the touch space, not in response to the physical contact with the illuminated screen, even though it may appear to the user that the system responds to the physical contact.

FIG. 3 is a diagram of an illustrative command, according to principles described herein. In the example, the tangible reference (301) is orthogonal to illustrate the images (302) depicted thereon. A finger (303) may press against the tangible reference (301) where a button (304) is depicted. As the finger (303) enters the touch space adjacent the button (304), the system may select the button (304). In some examples, the finger (303) may fail to make contact with the surface area of the tangible reference 301 upon which the button (304) is depicted and the system may still select the button (304) if the finger (303) makes contact with the touch space.

FIG. 4 is a diagram of an illustrative command, according to principles described herein. In this example, a first finger (401) and a second finger (402) may move towards each other in the touch space and adjacent to an image (403). The system may interpret such a hand gesture (400) as a command to shrink the image (403). In alternative examples, if the fingers (401, 402) move away from each other, the system may interpret the hand gesture (400) as a command to expand the image (403). In some examples, this command may be made with two fingers from the same hand.

Further, in some examples, a similar gesture may be interpreted as a rotation command, when the fingers do not move along a common line with each other. Physical contact with the tangible reference (404) may not be recognized by the system, but the system may interpret commands from the movements tracked in the touch space.

FIG. 5 is a diagram of an illustrative command, according to principles described herein. In this example, the hand gesture (500) includes dragging a finger (501) through the touch space. The dragging may begin over a depicted image (502). The system may interpret such movement in the touch space as a command to move the image (502) to wherever the finger (501) terminates the drag.

While various hand gestures and/or movements have been depicted with specific examples above to represent commands, any movement of any predetermined object may be used to give any command to the system. Further, while various images have been depicted with the specific example, any images may be used. For example, the system may display a word document that may be altered by the user though acting on the command inferred from the touch gesture. In other examples, the system may display a model that may be altered by acting on the command inferred from the touch gesture. For example, the components of the model may be deformed, altered, resized, or otherwise changed through the hand gestures.

Such systems may be incorporated in offices, homes, schools, vocational training facilities, airplanes, vehicles, churches, boats, movie theaters, theme parks, other locations, or combinations thereof. Such systems may operate word processing programs, modeling programs, video programs, mapping programs, educational programs, the internet, email, graphics programs, other programs, or combinations thereof.

Figure 6:
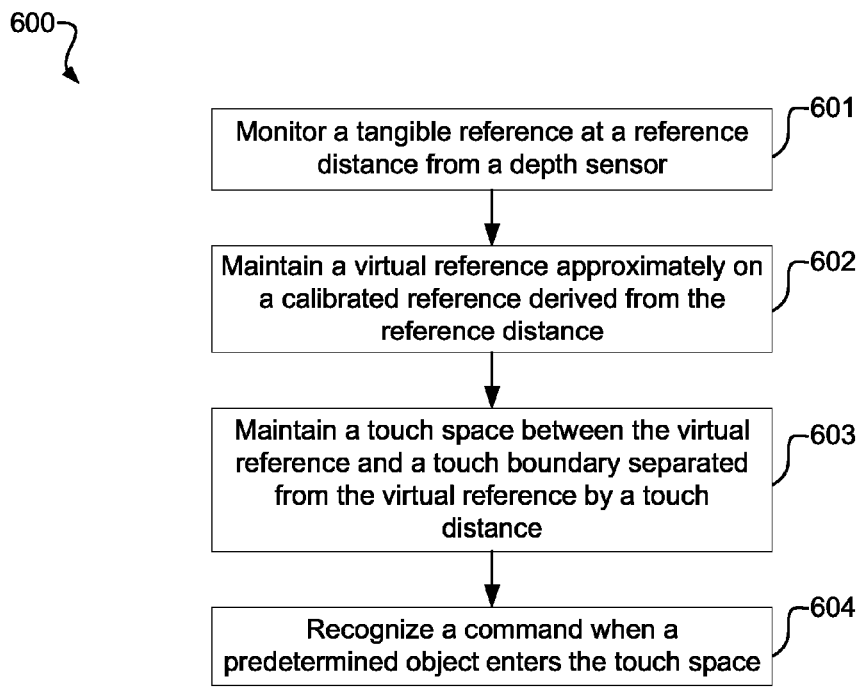
FIG. 6 is a diagram of an illustrative method for recognizing commands, according to principles described herein.

FIG. 6 is a diagram of an illustrative method (600) for recognizing commands, according to principles described herein. In this example, the method (600) includes monitoring (601) a tangible reference at a reference distance from a depth sensor, maintaining (602) a virtual reference approximately on a calibrated reference derived from the reference distance, maintaining (603) a touch space between the virtual reference and a touch boundary separated from the virtual reference by a touch distance, and recognizing (604) a command when a predetermined object enters the touch space.

In some examples, the method includes modifying the virtual reference as the tangible reference changes. In such examples, the touch boundaries and the touch space are also modified as the tangible reference changes. The tangible reference may change as objects are added to a surface that forms the virtual reference.

In some examples, the predetermined object is a human hand. The system may recognize the human hand by recognizing the contour of at least one fingertip of the hand. Further, the system may recognize the hand's fingertips and their location by estimating the hand's skeletal structure. In some examples, the system tracks the human hand more precisely by recognizing both the fingertips' contours as well as the hand's skeletal structure and merging the data from both analyses together.

In some examples, an image is formed on the tangible reference. A user may feel as though they are giving commands to the system as they touch the image, but the system may not recognize the physical touch. Instead, the system may track the depth of the user's hands, and as well as the gestures that the user makes as the user's hands come into contact with the touch space. In some examples, the image is projected with a projector onto the tangible reference. In other examples, the image is formed by the tangible reference, such as with a screen with pixel elements. However, the tangible reference may not be instrumented to recognize commands. Instead, the system may determine the users commands based on the three dimensional location of the user's hands and fingers based on data retrieved with a single depth sensor. In some examples, the system may incorporate multiple depth sensors.

In some examples, recognizing a command when a predetermined object enters the touch space includes recognizing three dimensional gestures as commands. Such three dimensional gestures may be gestures that are made within the touch space, but the user does not actually touch the tangible reference. Such three dimensional gestures may cancel a specific operation of the system, cut or erase an image, perform another task, or combinations thereof.

Figure 7:
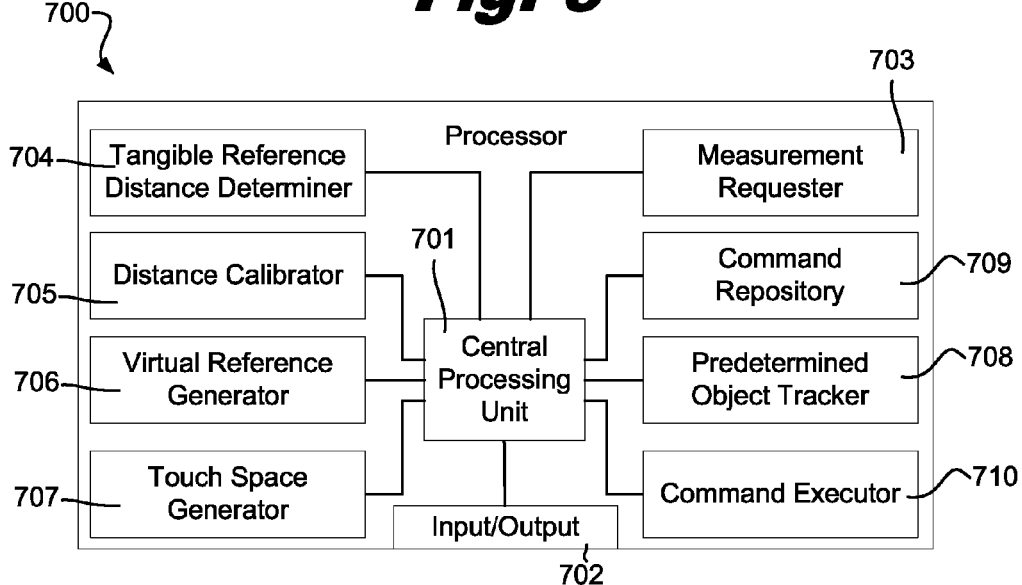
FIG. 7 is a diagram of an illustrative processor, according to principles described herein.

FIG. 7 is a diagram of an illustrative processor (700), according to principles described herein. In this example, the processor (700) has a central processing unit (CPU) (701) in communication with an input/output (702) that receives and sends data. The input/output (702) may receive raw data from the depth sensor. In FIG. 7, the processor (700) has a measurement requester (703) that may request the depth sensor to take measurements of the distances between locations of the tangible reference and the depth sensor. In some examples, the processor (700) is programmed to receive the raw data from the depth sensor without request. In some examples, the processor (700) receives a single batch of raw data when the system is turned on. In other examples, the processor (700) receives periodic batches of raw data from the depth sensor. In other examples, the processor requests measurements at periodic intervals, and the depth sensor accordingly takes the measurements and sends the raw data to the processor (700).

The raw data may be sent to the CPU (701), and the CPU (702) may forward the raw data to a tangible reference distance determiner (704) to determine the distances between the depth sensor and the tangible reference. In some examples, a distance calibrator (705) assists the tangible reference distance determiner (704) in determining the accurate distances of each of the measured location on the tangible reference. In other examples, the distance calibrator (705) adjusts the measured distances after the tangible reference distance determiner's processing is completed.

A virtual reference generator (706) may form a virtual reference on the calibrated measurements of the reference distances. A touch space generator (707) may use the virtual reference to form a touch boundary. The touch space generator (707) may offset the touch boundary by a defined touch distance from the virtual reference.

In some examples, when the tangible reference distance determiner (704) calculates the distances from the locations of the tangible reference, the processor (700) compares these distances to older distances previously measured. If the distance has not changed since the last measurement, no instructions are sent to the distance calibrator (705), virtual reference generator (706), or the touch space generator (707). However, in some examples, the processor may determine that the topography of the tangible reference has move or changed if the new measurements are different than the previous measurements. In such a situation, new measurement may be calibrated, the virtual reference may be regenerated over the calibrated three dimensional coordinates, and a new touch space may be regenerated.

In some examples, when the system is initially set up, the processor (700) requests that the depth sensor make distance measurements between the depth sensor and a large number of locations on the tangible reference. For example, the processor (700) may instruct the depth sensor to take measurements of every square millimeter of the tangible reference. Such high density measurements may allow the system to map the topography of the tangible reference with a high degree of accuracy.

However, in subsequent measurements, the depth sensor may make lower density measurements. For example, subsequent measurements may be taken for every square centimeter or less. In such an example, the subsequent measurements may be used to determine if the tangible reference has change since the previous measurements. If changes have occurred, the processor (700) may instruct for another high density measurement to be taken to accurately determine the changes. In some examples, the processor (700) instructs that subsequent high density measurements be retaken over the entire tangible reference or the processor (700) may instruct that high density measurements be taken over just those areas that appear to have changed. However, if the lower density measurements reveal no change in the tangible reference, then no further action may be taken. With such a protocol, the subsequent measurements may consume less energy than the initial measurements while still monitoring the tangible reference. Also, such a protocol allows the system to perform its operations at a faster rate.

In some examples, the depth sensor makes a consistent number of measurements during each interval. However, to reduce computing power and to speed up processing time, the tangible reference distance determiner (704) may select to process a fewer number of measurements than provided unless a change in tangible reference is determined.

The processor (700) may also have a predetermined object tracker (708). The tracker (708) may track the predetermined object within and outside of the touch space. However, the tracker (708) may interpret just those movements of the predetermined object within the touch space as commands. The tracker (708) may be in communication with a command repository (709) that contains compilation of movements and their associated commands.

In some examples, movements of the predetermined object over a particular image displayed on the tangible reference are interpreted differently than if the same movement occurred over a different image. For example, if a finger hovered over a visually depicted button, the hovering movement may be interpreted as a button click. However, if the same hovering movement occurred over a visually depicted model component of a modeling program, the movement may be interpreted as a command to select the model component to make changes to that component of the model.

Upon recognition of a specific command, a command executor (710) may cause the command to be executed. A command may include modifying the image, controlling a video, changing text, selecting images, controlling a volume, muting a telecommunications line, sending an email, other commands, or combinations thereof.

Figure 8:
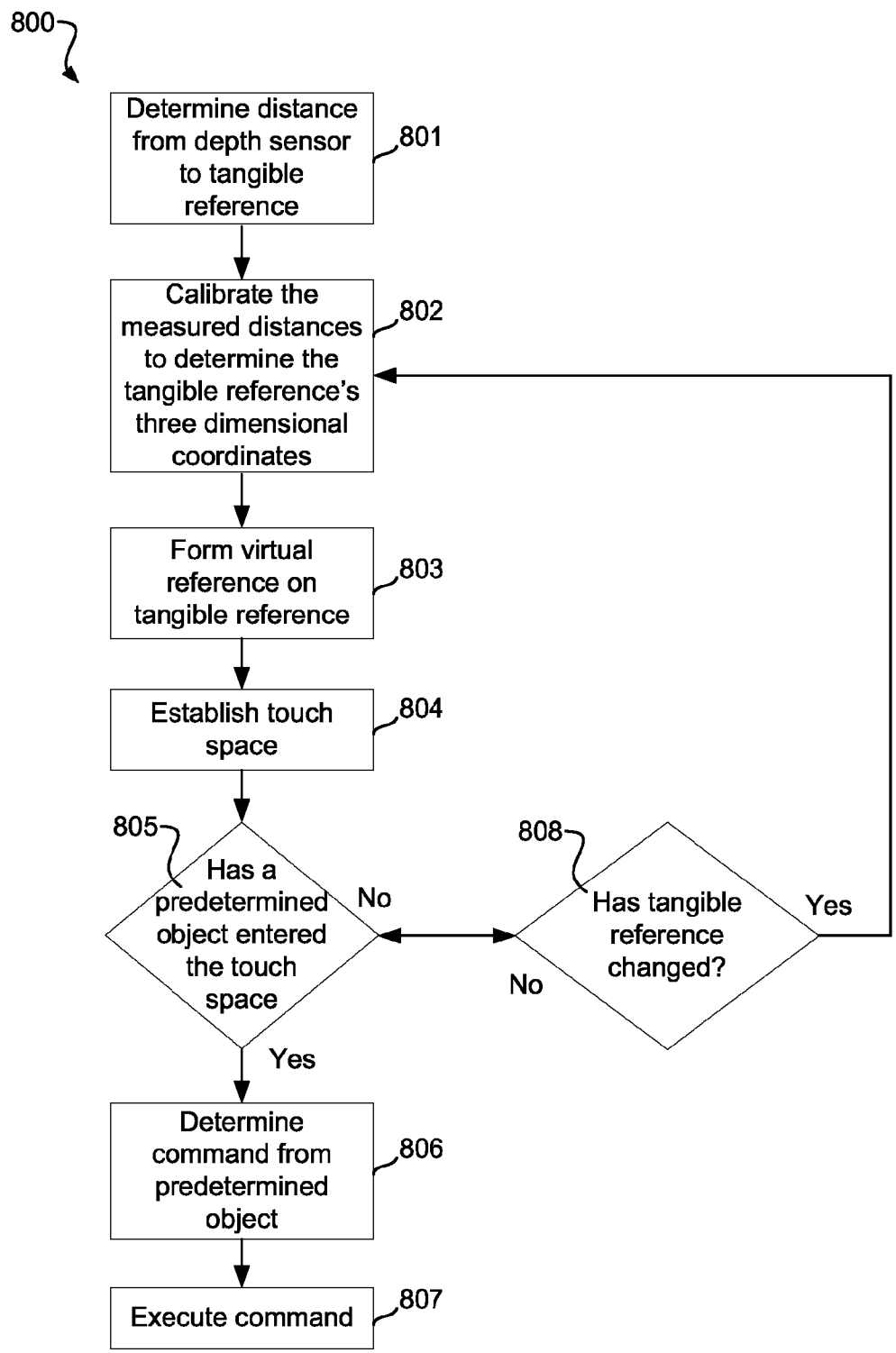
FIG. 8 is a diagram of an illustrative flowchart of a method for recognizing a command, according to principles described herein.

FIG. 8 is an illustrative flowchart (800) of a method for recognizing a command, according to principles described herein. In this example, the method includes determining (801) a distance from a depth sensor to a tangible reference and calibrating (802) the measured distances to determine the tangible reference's three dimensional coordinates. The method also includes forming (803) a virtual reference on the tangible reference upon determining the reference's coordinates and establishing (804) a touch space based on the virtual reference.

The method also includes determining (805) whether a predetermined object has entered into the touch space. If a predetermined object has entered into the touch space, then the method includes determining (806) the command from the predetermined object and executing (807) the command.

If a predetermined object has not entered into the touch space, then the method include determining (808) whether the tangible reference has changed. If not, then the method again determines (805) whether a predetermined object has entered the touch space. The system may continue to monitor whether an object has entered the touch space or whether the tangible reference has changed simultaneously. If the tangible reference has changed, then the measurements are calibrated (802) and the new three dimensional coordinates are determined.

Figure 9:
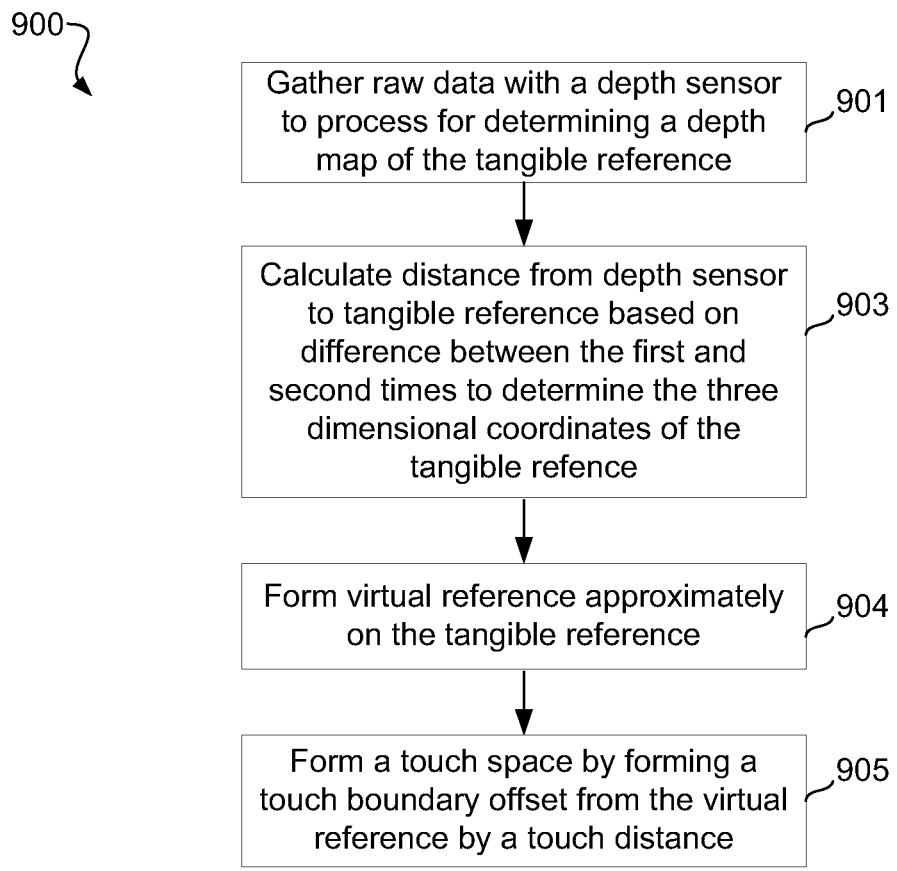
FIG. 9 is a diagram of an illustrative method for forming a touch space, according to principles described herein.

FIG. 9 is a diagram of an illustrative method (900) for forming a touch space, according to principles described herein. The method (900) includes gathering (901) raw data with a depth sensor to process for determining a depth map of the tangible reference. The method (900) further includes calibrating (903) the raw data obtained from the depth sensor. The reference distance may be determined based raw data; however, the raw data is unlikely to represent the true three dimensional coordinates of the tangible reference. Since most of the tangible reference is unlikely to be perfectly perpendicular with the depth camera, the raw data may be calibrated to normalize the data to accurately reflect the tangible reference's true location in three dimensional space.

The raw data may be calibrated through an ad-hoc calibration approach, a three dimensional homography calibration approach, a three dimensional affine transformation approach, other calibration approaches, or combinations thereof.

In one approach, the system assumes that the tangible reference is flat and substantially perpendicular to the depth camera. In such an example, the reference distances between each location on the tangible reference and the depth sensor may be determined by using aspect ratios. In such an example, the system may determine that the shortest reference distance is directly in front of the depth camera and thus determine that the entire surface is space apart from the camera by that shortest measured reference distance. The point directly in front of the depth camera may be referred to as the origin for purposes of calibrating. All of the other measured reference distances are between the depth sensor and locations that are not directly in front of the depth sensor. As a consequence, the other reference distances are longer. The other locations are offset from the origin by an offset distance. The offset distance may be determined by using the longer measured reference distance and the shortest measured reference distance as two of the sides of a triangle. The remaining triangle's side length may be calculated and may be equal to the offset distance. Thus, the accurate three dimensional coordinate of this offset location may be determined and the system may normalize its measurements of the tangible reference to reflect the true coordinate.

In other examples, the tangible reference is not planar, and therefore, the calibration process is more complex. The accurate three dimensional coordinates of the offset locations may be determined with the following equation: Calibrated Depth=(H)(Measured Depth). H may be represented by the following matrix function:

$$\begin{bmatrix} U' \\ V' \\ W' \\ T' \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} U \\ V \\ W \\ T \end{bmatrix}, \text{where}$$

$$X = \frac{U}{T}, Y = \frac{V}{T}, Z = \frac{W}{T},$$

and where U, V, W, and T are a homogenous representations of [X, Y, Z] and $U^1$, $V^1$, $W^1$, and $T^1$ represent the calibrated coordinates adjusted to reflect their true three dimensional positions. The homography parameters $h_{11}$~$h_{44}$ correspond to the null space of matrix M from the following equation:

$$MH = \begin{bmatrix} x_1 & y_1 & z_1 & 1 & 0 & 0 & 0 & 0 & 0 & 0 & 0 & 0 & -x_1^r x_1 & -x_1^r y_1 & -x_1^r z_1 & -x_1^r \\ 0 & 0 & 0 & 0 & x_1 & y_1 & z_1 & 1 & 0 & 0 & 0 & 0 & -y_1^r x_1 & -y_1^r y_1 & -y_1^r z_1 & -y_1^r \\ 0 & 0 & 0 & 0 & 0 & 0 & 0 & 0 & x_1 & y_1 & z_1 & 1 & -z_1^r x_1 & -z_1^r y_1 & -z_1^r z_1 & -z_1^r \\ & & & & & & & & \vdots & & & & & & & \\ x_5 & y_5 & z_5 & 1 & 0 & 0 & 0 & 0 & 0 & 0 & 0 & 0 & -x_5^r x_5 & -x_5^r y_5 & -x_5^r z_5 & -x_5^r \\ 0 & 0 & 0 & 0 & x_5 & y_5 & z_5 & 1 & 0 & 0 & 0 & 0 & -y_5^r x_5 & -y_5^r y_5 & -y_5^r z_5 & -y_5^r \\ 0 & 0 & 0 & 0 & 0 & 0 & 0 & 0 & x_5 & y_5 & z_5 & 1 & -z_5^r x_5 & -z_5^r y_5 & -z_5^r z_5 & -z_5^r \end{bmatrix} \begin{bmatrix} h_{11} \\ h_{12} \\ h_{13} \\ h_{14} \\ h_{21} \\ h_{22} \\ h_{23} \\ h_{24} \\ h_{31} \\ h_{32} \\ h_{33} \\ h_{34} \\ h_{41} \\ h_{42} \\ h_{43} \\ h_{44} \end{bmatrix} = \begin{bmatrix} 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix},$$

where the variables in matrix M represent actual 3D coordinates measurements (x,y,z) from the depth sensor and corresponding 3D coordinates (x',y',z') on the virtual reference. The homography parameters $h_{11}$~$h_{44}$ are determined from matrix M through singular value decomposition.

In some examples, the offset locations are determined with the following equation: Calibrated Depth=(A)(Measured Depth). A may be represented by the following matrix function:

$$\begin{bmatrix} X' \\ Y' \\ Z' \\ 1 \end{bmatrix} = \begin{bmatrix} r_{11} & r_{12} & r_{13} & T_x \\ r_{21} & r_{22} & r_{23} & T_y \\ r_{31} & r_{32} & r_{33} & T_z \\ 0 & 0 & 0 & 1 \end{bmatrix} \begin{bmatrix} X \\ Y \\ Z \\ 1 \end{bmatrix},$$

where the $r_{xx}$ variables represents rotation and the $T_x$ variables represents translation. In this calibration approach, X, Y, and Z represent the measured coordinates, and 1 represents a reference point in the three dimensional space referred to as the origin. To calibrate for X coordinate of any of the measured coordinates, X, Y, and Z are multiplied by the variables $r_{11}$, $r_{12}$, and $r_{13}$, respectively to determine the translation angle from the origin to move the X coordinate in three dimensional space. After the translation angle is determined, the X coordinate may be translated along that angle by a distance determined by 1 multiplied by the $T_x$. The final location of the X coordinate determines the X coordinate's value. The values for the Y and Z coordinates may be determined in a similar manner. The variables of matrix function A may be estimated using factorization from the following equation:

$$\begin{bmatrix} x_1 & y_1 & z_1 & 1 & 0 & 0 & 0 & 0 & 0 & 0 & 0 & 0 \\ 0 & 0 & 0 & 0 & x_1 & y_1 & z_1 & 1 & 0 & 0 & 0 & 0 \\ 0 & 0 & 0 & 0 & 0 & 0 & 0 & 0 & x_1 & y_1 & z_1 & 1 \\ & & & & & & \vdots & & & & & \\ x_4 & y_4 & z_4 & 1 & 0 & 0 & 0 & 0 & 0 & 0 & 0 & 0 \\ 0 & 0 & 0 & 0 & x_4 & y_4 & z_4 & 1 & 0 & 0 & 0 & 0 \\ 0 & 0 & 0 & 0 & 0 & 0 & 0 & 0 & x_4 & y_4 & z_4 & 1 \end{bmatrix} \begin{bmatrix} r_{11} \\ r_{12} \\ r_{13} \\ t_x \\ r_{21} \\ r_{22} \\ r_{23} \\ t_y \\ r_{31} \\ r_{32} \\ r_{33} \\ t_z \end{bmatrix} = \begin{bmatrix} x_1^r \\ y_1^r \\ z_1^r \\ \vdots \\ x_4^r \\ y_4^r \\ z_4^r \end{bmatrix},$$

where the variables of the matrix represent actual 3D coordinates measurements from the depth sensor, and $x_1'$, $y_1'$, and $z_1'$ represent corresponding 3D coordinates on the virtual reference.

After determining the true three dimensional coordinates of the tangible reference, the method (900) includes forming (904) a virtual reference approximately on the tangible reference's true coordinates and forming (905) a touch space by forming a touch boundary offset from the virtual reference by a specific touch distance.

Figure 10:
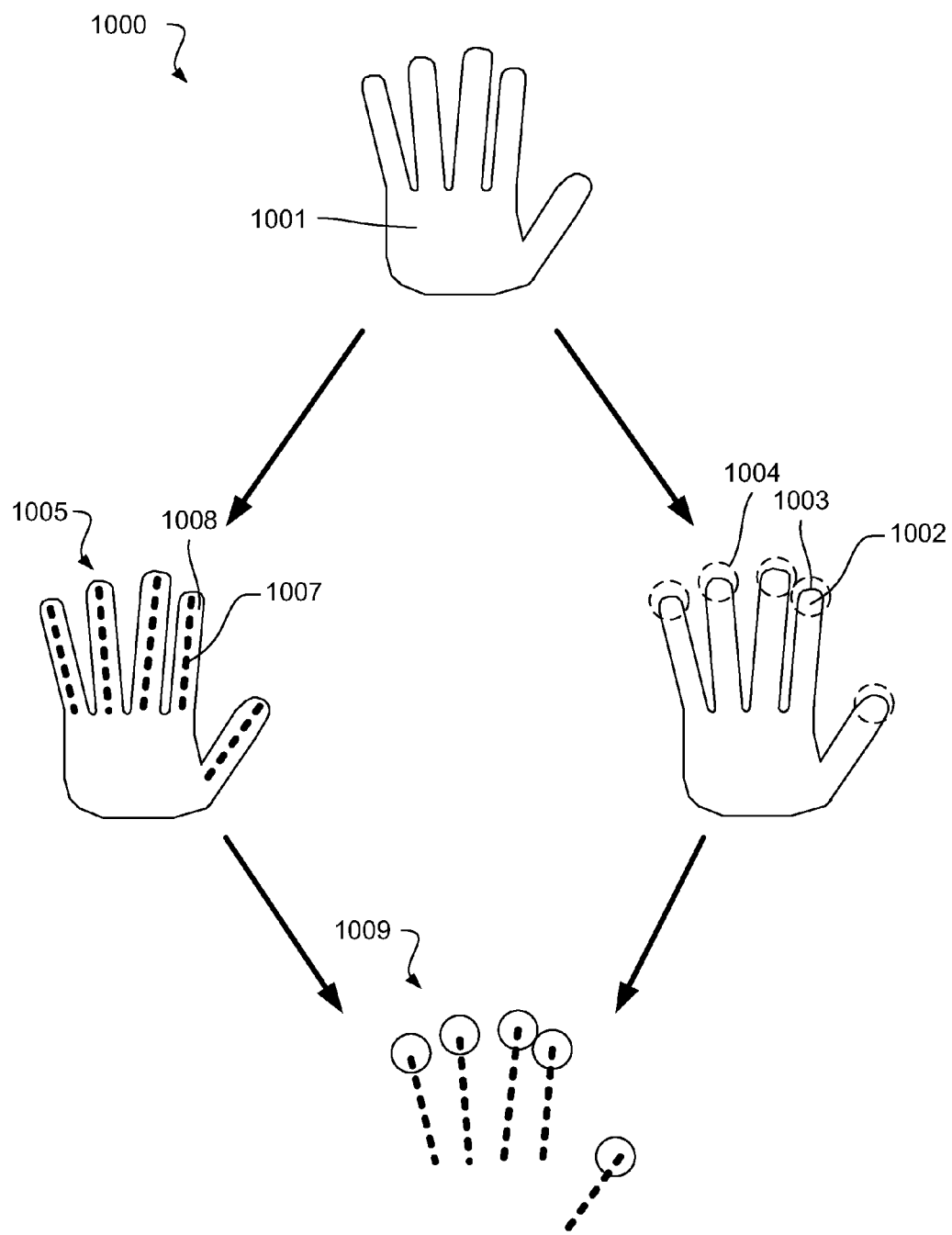
FIG. 10 is a diagram of an illustrative analysis for recognizing a predetermined object, according to principles described herein.

FIG. 10 is a diagram of an illustrative analysis (1000) for recognizing a predetermined object, according to principles described herein. In this example, a human hand (1001) is the predetermined object. In some examples, the depth sensor gathers data to identify and to track the human hand (1001).

In the example of FIG. 10, the system identifies the human hand (1001) through two separate approaches. In one approach, the system localizes the fingertips (1002) through a contour analysis. The contour analysis may include recognizing an edge (1003) of the fingertips (1002) and recognizing that the fingertips (1002) may move independently of each other. The system may encircle each fingertip with virtual tracking circles (1004) that follows the contour of each fingertip. The system may more easily recognize the movements of the fingertips (1002) by tracking their movement of the virtual tracking circles (1004).

In the other approach, the system estimates a skeletal structure (1005) of the hand (1001). In this approach, the system may make assumptions about the location of the hand's skeletal structure (1005) and track the estimated skeletal structure's location. For example, the center of a hand's finger is thicker than the finger's periphery. Accordingly, the depth sensor may measure that the finger's surface at its center is closer to the depth sensor than the finger's periphery. Thus, the depth sensor may determine the three dimensional profile of the hand (1001) and its fingers and estimate the location of their skeletal structure (1005).

The system may make assumptions based on this retrieved information about the location of the hand's skeletal structure (1005). The system may form virtual lines over the locations that the system estimates the hand's skeletal structure (1005) to be. For example, a virtual line (1007) may be formed over the length of finger (1008) at the finger's center. As finger (1008) bends or moves, the virtual line(s) (1007) moves accordingly. The changes made to the virtual line (1007) may be determined in part by the angle that the depth sensor measures the finger (1008). For example, if the hand (1001) and the tangible reference are substantially perpendicular to the measuring signals emitting by the depth sensor, the virtual line (1007) formed over finger (1008) may appear to become shorter when finger (1008) is bent forward towards the tangible reference or longer as the finger (1008) is extended away from the tangible reference. Such bending may occur when the finger (1008) is bending forward to make a touching contact with the tangible reference. By using, the skeletal approach, the system may more easily track the hand (1001) and its finger (1008).

The data from both approaches may be merged together. While either approach may independently provide useful information for tracking a human hand (1001), the combined data (1009) from both approaches provides the system with a more accurate way of tracking the hand (1001). For example, the system may easily determine that the hand (1001) is moving in front of the tangible reference with the fingertip contour approach. However, determining that one of the fingertips is actually in the touch space while the hand (1001) is moving may be harder to determine. The skeletal analysis may provide additional information that allows the system to track when the fingers bend forward to make touching contacts with the tangible reference. Also, the system may detect that a portion of the hand (1001) other than the fingertips have entered into the touch space. In such a situation, the hand gestures recognized by the skeletal structure approach may recognize that the entrance into the touch space is not intended to be a command.

Figures 11, 12:
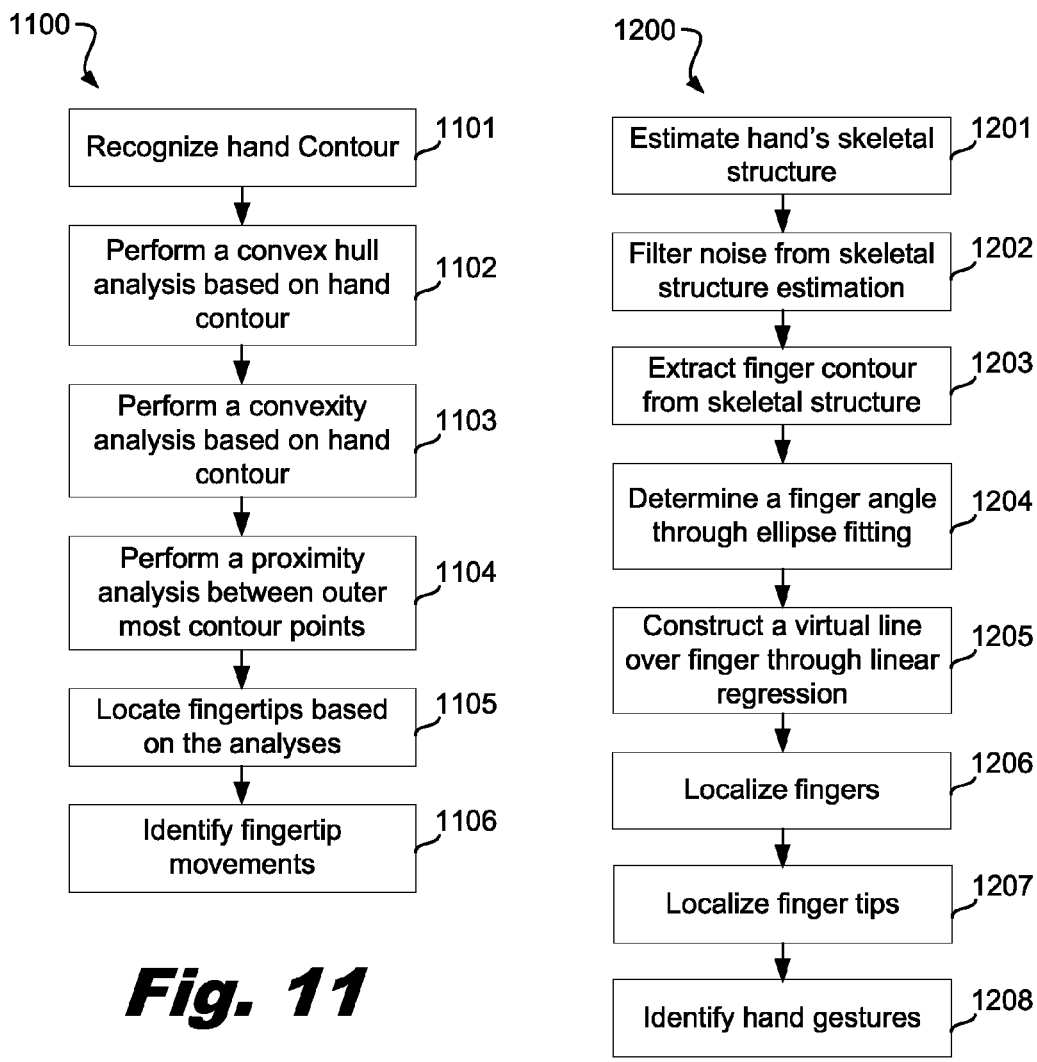
FIG. 11 is a diagram of an illustrative method for recognizing a predetermined object, according to principles described herein.
FIG. 12 is a diagram of an illustrative method for recognizing a predetermined object, according to principles described herein.

FIG. 11 is a diagram of an illustrative method (1100) for recognizing a predetermined object, according to principles described herein. In this example, the method (1100) includes recognizing (1101) a contour of a hand. The system may use repository of contour shapes to distinguish between hand contour's and contours of other shapes. After recognizing (1101) a hand's contour, the method (1100) includes performing (1102) a convex hull analysis based on the hand's contour. The convex hull analysis may include identifying the outer most points of the entire hand's contour and defining the maximum area that may be circumscribed with the outer most points. Next, the method (1100) includes performing (1103) a convexity analysis based on the hand's contour. The convexity analysis may include identifying the lowest most points between the hand's fingers. When the lowest most points are identified, the maximum area identified during the convex hull analysis is reduced and the remaining area includes an area more resembles a human hand by connecting the lower most points with the outer most points.

After forming the hand shape through convexity analysis, the method (1100) includes performing (1104) a proximity analysis to determine the distance between each of the outermost points and locating (1105) the fingertips of the hand. With the fingertips localized, the system may track the movement of each fingertip independently of the other fingertips, and the system may identify (1106) movements of the fingertips.

FIG. 12 is a diagram of an illustrative method (1200) for recognizing a predetermined object, according to principles described herein. In this example, the method (1200) includes estimating a hand's skeletal structure. For example, the depth sensor may identify the surface features of the hand by determining each features relative distance from the depth sensor. Some of these measurements may give false positive readings, and the method may include filtering (1202) this noise from the measurements. From the estimation, the system may extract (1203) the finger's contour and determine (1204) an angle that the finger is positioned through ellipse fitting. Ellipse fitting may include constructing a curve that best fits the data points within the determined finger contour.

In FIG. 12, a virtual line is constructed (1205) with the data points from the above mentioned analyses through linear regression. The method (1200) may further include localizing (1206) each finger such that each finger may be independently tracked from the other fingers on the same hand. Next, the method (1200) may include localizing (1207) each fingertip from the fingers such that the fingertips may be independently tracked.

With the fingers and the fingertips localized, the system may identify (1208) hand gestures performed by the hands and the movement of the fingertips. In some examples, the system may recognize commands when fingertip movement within the touch space occurs simultaneously with hand gestures recognized as commands.

Figure 13:
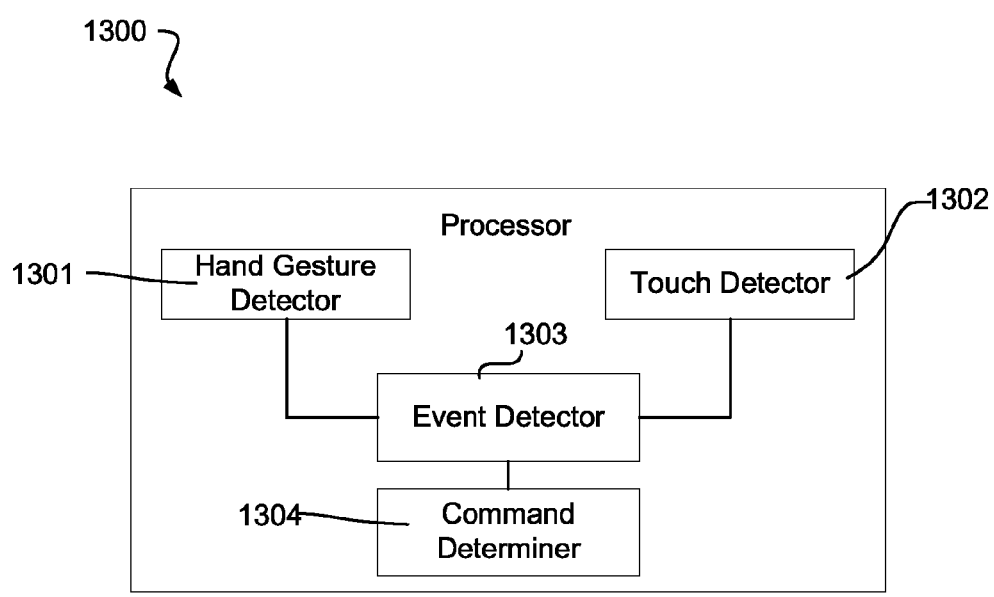
FIG. 13 is a diagram of an illustrative processor for recognizing a command, according to principles described herein.

FIG. 13 is a diagram of an illustrative processor (1300) for recognizing a command, according to principles described herein. In this example, the processor (1300) includes a hand gesture detector (1301) that identifies movements with the skeletal structure tracking approach. The processor (1300) further includes a touch detector (1302) that identifies movements made with the fingertips and tracked with fingertip contour tracking approach. The information from both detectors (1301, 1302) may be sent to an event detector (1303) that detects the occurrence of an event based on the combined information. Upon detection of an event, the event detector (1303) may send the event information to a command determiner (1304) to determine whether the event should be interpreted as a command. If the event is interpreted as a command, the processor (1300) may send notice to a command executor to execute the command.

The hand gesture detector (1301) may easily identify the movements of the fingers during a hand gesture. For example, the during a pinch hand gesture where two fingers on the same hand come together, the skeletal analysis may recognize that the fingers are moving closer together by the way that the fingers are bending or angling.

During the same pinch hand gesture, the touch detector (1302) may easily identify that movement of the fingertips moving within the touch space. The combination of the data from the touch detector (1302) and the hand gesture detector (1301) may allow for the system to easily recognize commands. Thus, in some examples, the detection of an event includes inferring a touch event from the three dimensional location of the fingertips and considering the depth change of the finger with the physical model of the finger.

For example, the system reduces and/or eliminates false touching commands from hand parts other than the fingertips. For example, the palm of the hand may enter into the touch space, such as to rest on the tangible surface. However, the gesture detection from the skeletal analysis may recognize that the inferred touch event is not from a fingertip and conclude the hand's palm entering the touch space is not a command. Such a system allows for real time command interpretation.

While certain hand movements and hand gestures have been described in the preceding examples, any hand movement or hand gesture may be used to communicate with the system. Further, while certain hand movements and hand gestures have been interpreted as specific commands in the preceding examples, the system may recognize any hand movement and/or gesture to be any command as programmed. For example, the hand gestures that may be used with the principles described herein are not limited to those types of hand gestures compatible with touch screens. For example, the system may recognize a scissor gesture made with two index fingers of the same hand coming together. Further, the commands recognized by the system may not be limited to single touch type commands. Multi-touch type commands may be used. Further, the commands may be not be limited to touch type commands either.

In some examples, the system may recognize commands from three dimensional gestures made with a user's hands although the fingers do not actually touch the tangible reference. In such examples, the system may interpret the three dimensional gestures as commands to control a particular aspects of the system. For example, the images may be modified, cleared, or otherwise altered with waving a hand. In other examples, the three dimensional gestures may be interpreted as commands to cut or erase part of an image or to cancel a particular operation. In some examples, the three dimensional gestures may be made with other part of a user's body.

In some examples, the system may be customized to account of hands that do not fall within a recognizable hand contour contained within a hand contour repository. For example, the system may scan a hand with a deformity, and the system may process the hand such that the specific hand is recognized by the system through fingertip contour approach, the skeletal structure estimation approach, other tracking approaches, or combinations thereof.

While specific objects and surfaces have been depicted as tangible references in the preceding examples, any object or surface may be used as a tangible reference. In some examples, the tangible reference is not instrumented.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for recognizing a command with a depth sensor, comprising:
   monitoring a tangible reference at a reference distance from a depth sensor;
   maintaining a virtual reference approximately on calibrated three dimensional coordinates derived from said reference distance, said virtual reference intermediary to said tangible reference and said depth sensor;
maintaining a touch space between said virtual reference and a touch boundary separated from said virtual reference by a touch distance; and
recognizing a command when a predetermined object enters said touch space.

2. The method of claim 1, wherein maintaining a virtual reference approximately on calibrated three dimensional coordinates derived from said reference distance includes modifying said virtual reference as said tangible reference changes.

3. The method of claim 1, wherein said predetermined object is a human hand.

4. The method of claim 3, wherein recognizing a command when a predetermined object enters said touch space includes recognizing a contour of at least one fingertip of said human hand.

5. The method of claim 4, wherein recognizing a command when a predetermined object enters said touch space includes estimating a skeletal structure of said human hand.

6. The method of claim 5, further comprising merging data of said contour of said at least one fingertip and said skeletal structure.

7. The method of claim 1, wherein said touch distance of said touch space is less than five millimeters.

8. The method of claim 1, wherein recognizing a command when a predetermined object enters said touch space includes recognizing three dimensional gestures as commands.

9. The method of claim 8, wherein forming an image on said tangible reference includes projecting an image onto said tangible reference.

10. The method of claim 1, further comprising forming an image on said tangible reference.

11. A system for recognizing a command, comprising:
a depth sensor positioned to determine a distance that a surface is away from said depth sensor;
a processor in communication with said depth sensor; and said processor is programmed to:
  maintain a virtual reference intermediate to the depth sensor and surface based on continuous input received with said depth sensor;
  establish a touch space adjacent said virtual reference; and
  track a human hand moving into said touch space.

12. The system of claim 11, wherein said processor is further programmed to localize finger tips of said human hand.

13. The system of claim 11, wherein said processor is further programmed to estimate a skeletal structure of said human hand.

14. The system of claim 11, further comprising a projector that forms an image on said tangible reference.

15. The system of claim 11, wherein maintaining a virtual reference includes modifying said virtual reference as said tangible reference changes.

16. A computer program product, comprising:
a tangible computer readable storage medium, said computer readable storage medium comprising computer readable program code embodied therewith, said computer readable program code comprising:
  computer readable program code to monitor a distance that a surface is away from a depth sensor; and
  computer readable program code to maintain a touch space adjacent a virtual reference based on said surface; said touch space intermediary to said surface and said depth sensor; and
  computer readable program code to recognize a command when a human hand enters said touch space.

17. The computer program product of claim 16, further comprising computer readable program code to localize finger tips of said human hand and to estimate a skeletal structure of said human hand.

18. The computer program product of claim 16, further comprising computer readable program code to form an image on said tangible reference.

19. The computer program product of claim 16, further comprising computer readable program code to modifying said virtual reference as said tangible reference changes.

20. The computer program product of claim 16, in which said distance that said surface is away from said depth sensor is less than five millimeters.

* * * * *